US012481833B2

United States Patent
Alexander et al.

(10) Patent No.: US 12,481,833 B2
(45) Date of Patent: Nov. 25, 2025

(54) DOMAIN ADAPTATION OF MACHINE LEARNING MODELS FOR CLASSIFICATION

(71) Applicant: Salesforce, Inc., San Francisco, CA (US)

(72) Inventors: Zachary Alexander, Berkeley, CA (US); Shubham Mehrotra, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 652 days.

(21) Appl. No.: 17/836,591

(22) Filed: Jun. 9, 2022

(65) Prior Publication Data
US 2023/0401387 A1    Dec. 14, 2023

(51) Int. Cl.
*G06F 40/35*    (2020.01)
*G06N 5/022*    (2023.01)

(52) U.S. Cl.
CPC .............. *G06F 40/35* (2020.01); *G06N 5/022* (2013.01)

(58) Field of Classification Search
CPC ......... G06F 40/35; G06F 40/30; G06N 5/022; G06N 3/006; G06N 3/096; G06N 20/00; H04L 51/02
See application file for complete search history.

(56) References Cited

U.S. PATENT DOCUMENTS

| | | | |
|---|---|---|---|
| 10,769,501 B1 * | 9/2020 | Ando | G06V 30/274 |
| 2022/0197306 A1 * | 6/2022 | Cella | G05B 19/41865 |
| 2023/0052903 A1 * | 2/2023 | Mazumder | G06Q 10/107 |
| 2023/0368773 A1 * | 11/2023 | Mishra | G06F 3/167 |

OTHER PUBLICATIONS

Barshan, E. et al., Supervised Principal Component Analysis: Visualization, Classification and Regression on Subspaces and Submanifolds, Pattern Recognition, vol. 44, Issue 7, Nov. 30, 2010, pp. 1357-1371.
Chen, Q. et al., "BERT for Joint Intent Classification and Slot Filling," arXiv:1902.10909v1, Feb. 28, 2019, pp. 1-6.
(Continued)

*Primary Examiner* — Darioush Agahi
(74) *Attorney, Agent, or Firm* — Polygon IP, LLP

(57) ABSTRACT

The system receives a base machine learning model trained using a generic dataset. For example, the base machine learning model may be an off-the-shelf machine learning based model. The base machine learning model is trained to receive an input and generate a feature vector representing the input. The input may be a natural language expression, an image, or any other type of input. The system receives a domain specific training dataset based on known categories for input values. The system determines an orthogonal transformation for reducing the dimensions of the base machine learning model using on the domain specific training dataset. The system applies the orthogonal transformation to the base machine learning model to obtain a domain specific machine learning model. The system uses the domain specific machine learning model for processing inputs, for example, in a production environment.

20 Claims, 7 Drawing Sheets

(56) References Cited

OTHER PUBLICATIONS

Cohan, A. et al., "Structural Scaffolds for Citation Intent Classification in Scientific Publications," arXiv:1904.01608v2, Sep. 30, 2019, pp. 1-11.

Feng, F. et al., "Language-agnostic BERT Sentence Embedding," arXiv:2007.01852v2, Mar. 8, 2022, pp. 1-14.

Ge, W. et al., "Deep Metric Learning with Hierarchical Triplet Loss," Proceedings of the European Conference on Computer Vision (ECCV), Sep. 2018, pp. 1-17.

Guo, G. et al., "KNN Model-Based Approach in Classification," OTM Confederated International Conferences, On the Move to Meaningful Internet Systems, Nov. 3, 2003, pp. 986-996.

Henderson, M. et al., "ConveRT: Efficient and Accurate Conversational Representations from Transformers," arXiv:1911.03688v2, Apr. 29, 2020, pp. 1-11.

Kang, M. et al., "Introduction to Machine Learning: K-Nearest Neighbor Algorithm," CS489/689: Introduction to Machine Learning, Department of Computer Science, University of Nevada, Las Vegas, Jan. 2020, pp. 1-25.

Liu, B. et al. "Attention-Based Recurrent Neural Network Models for Joint Intent Detection and Slot Filling," arXiv:1609.01454v1, Sep. 6, 2016, pp. 1-5.

Nguyen, B. et al., "Improved deep embedding learning based on stochastic symmetric triplet loss and local sampling," Neurocomputing, vol. 402, Apr. 20, 2020, pp. 209-219.

Vogelstein, J. T. et al., "Supervised dimensionality reduction for big data," Nature Communications, vol. 12.1, May 17, 2021, pp. 1-9.

Wikipedia, "Triplet loss," Jul. 1, 2022, 3 pages, [Online] [Retrieved on Jan. 17, 2023] Retrieved from the internet <URL: https://en.wikipedia.org/wiki/Triplet_loss>.

Wikipedia, "Winograd schema challenge," Nov. 11, 2022, 6 pages, [Online] [Retrieved on Jan. 17, 2023] Retrieved from the internet <URL: https://en.wikipedia.org/wiki/Winograd_schema_challenge>.

Yu, M., et al., Diverse Few-Shot Text Classification with Multiple Metrics, arXiv:1805.07513v1, May 19, 2018, pp. 1-16.

* cited by examiner

DOMAIN ADAPTATION OF MACHINE LEARNING MODELS FOR CLASSIFICATION

FIELD OF ART

The concepts described herein relate to machine learning in general, and more specifically to adaptation of machine learning models to specific domains such as natural language processing for chatbot conversation.

BACKGROUND

Some online systems allow users to interact with the system using natural language expressions (e.g., via voice or textual input) such as queries or commands. These systems respond with actions appropriate for the users' natural language expressions. Such systems are referred to as chatbots, conversational assistants, artificial intelligence (AI) assistants, intelligent virtual assistants, or virtual agents. A chatbot may analyze user utterances using artificial intelligence techniques including machine learning based models, for example, artificial neural networks such as convolutional neural networks, recurrent neural networks, or multi-layer perceptrons that help the chatbot determine an intent of a user utterance. Machine learning based models for analyzing natural language sentences are typically trained using data that represents typical sentences used in a given situation. However, in practice a user may use sentences that differ from the training data, for example, a user may make a mistake while speaking or may use slangs, and so on. As a result, the machine learning model may perform poorly in production even though the performance is good during training.

Figure 1:
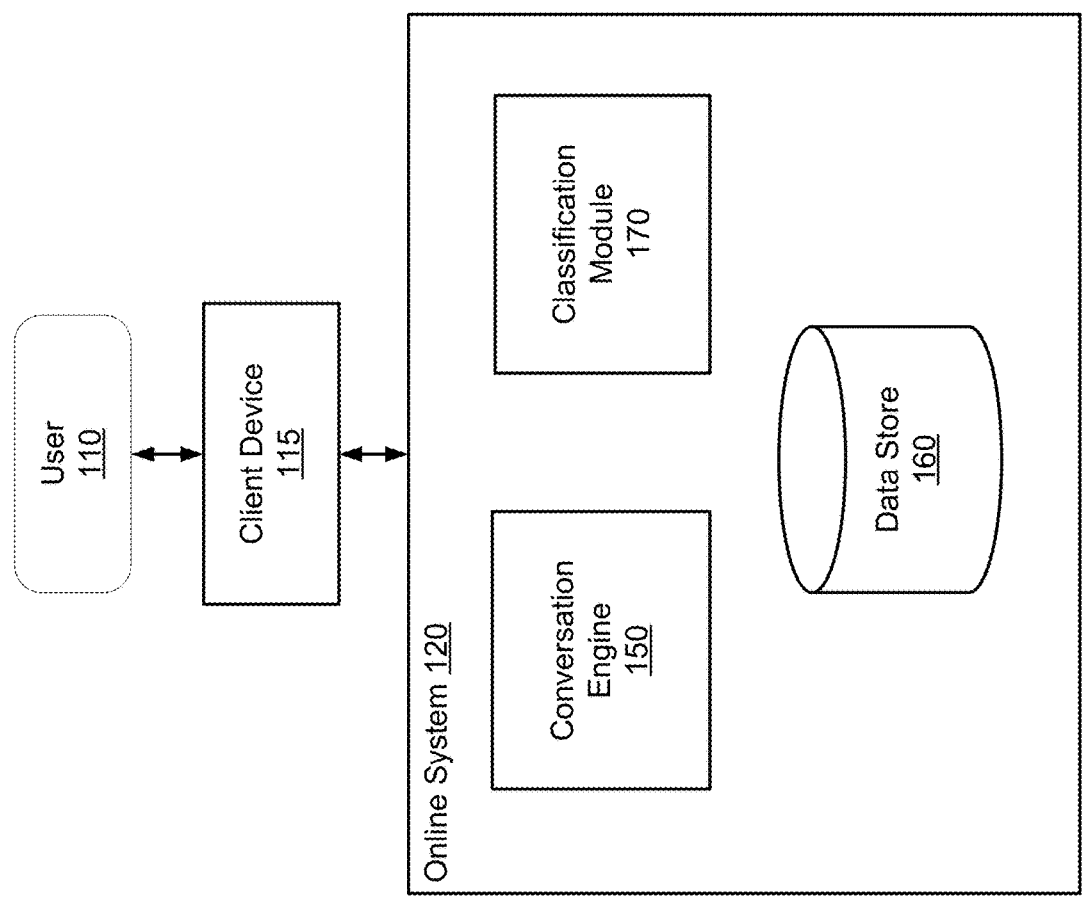
FIG. 1 is a block diagram of a system environment for performing natural language interactions with an online system, according to one embodiment.

The figures depict embodiments for purposes of illustration only. One skilled in the art will readily recognize from the following description that alternative embodiments of the structures and methods illustrated herein may be employed without departing from the principles described herein.

DETAILED DESCRIPTION

A system according to various embodiments performs adaptation of a machine learning model to specific domains. For example, a generic machine learning model that classifies natural language sentences may be adapted for use for a chatbot used by an online system processing a specific type of requests, for example, an online reservation system. The machine learning model may be used to perform intent classification of natural language expressions processed by the chatbot that performs natural language conversations with users. The techniques disclosed herein for domain adaptation of machine learning models may be used for other applications, for example, for image classification.

According to an embodiment, the system receives a base machine learning model trained using a generic dataset, for example, a dataset that is not specific to any particular domain. For example, the base machine learning model may be an off-the-shelf machine learning based model. The base machine learning model is trained to receive a natural language expression and generate a feature vector representing the natural language expression. The system may be able to determine intent of most of the natural language expressions used by a domain specific chatbot using the base machine learning model. However, certain phrases may have specific meaning in the given domain that the base machine learning model may not be able to classify accurately. For example, "change" and "cancel" terms may be classified as the same intent by the base machine learning model but represent different intents in an online reservation system. Accordingly, the base machine learning model would fail while classifying such requests. The system performs domain adaptation of the base machine learning model to generate a domain specific machine learning model that is able to accurately classify such domain specific terms.

The system performs domain adaptation of the base machine learning model as follows. The system receives a domain specific training dataset based on known intents. The system determines an orthogonal transformation on the domain specific training dataset. The system applies the orthogonal transformation to the base machine learning model to obtain a domain specific machine learning model with reduced dimensions.

The system uses the domain specific machine learning model for processing inputs, for example, in a production environment. For example, the system receives an input natural language expression used in a chatbot conversation. The system executes the domain specific machine learning model based on the received natural language expression to obtain a feature vector representing the input natural language expression. The system compares the feature vector representing the input natural language expression to stored feature vectors that are mapped to intents. The system determines the intent of input natural language expression based on the intent of a matching stored feature vector. The system takes an action based on the determined intent, for example, by performing a transaction that may be requested by the user via the chatbot conversation.

Even though the disclosed technique has similarities with PCA (principal component analysis), the approach is distinct from PCA. PCA based approaches subtract a global mean vector from training data. The disclosed technique is distinct from PCA and treats the problem as one of constrained optimization. The disclosed system jointly minimizes intra-class distances, and maximize inter-class distances, while satisfying the constraint of an orthogonal transformation.

System Environment

FIG. 1 is a block diagram of a system environment for performing natural language interactions with an online system, according to one embodiment. The system environment includes an online system 120 that communicates with users via the users' client devices 115. The online system 120 includes a conversation engine 150, a classification module 170, and a data store 160. The online system 120 may include other components not shown in FIG. 1, such as various applications, other types of data stores, and so on. The system environment may include other elements not shown in FIG. 1, such as a network interconnecting the various components such as the online system 120 and the client devices 115.

In an embodiment, the conversation engine 150 uses chatbots to perform conversations with users 110. A chatbot allows users 110 to use natural language interface to interact with the online system 120 using an application running on a client device 115. A chatbot may allow users to perform a set of tasks using the online system 120. For example, the online system 120 may allow users to perform certain types of transactions using the natural language interface of the chatbot. An enterprise that performs certain types of transactions may customize the chatbot to allow users to have conversations with the online system 120 to perform tasks related to the transactions, for example, perform authentication, execute a transaction, check status of a transaction, and so on.

Users 110 can perform natural language conversations with the online system 120, for example, to perform certain tasks. The conversation engine 150 stores the instructions that allow the online system 120 to perform natural language conversations with users 110. The conversation engine 150 receives a user utterance from a user. The user utterance includes a natural language expression. The conversation engine 150 determines the intent of the user requested via the natural language expression. The conversation engine 150 invokes the classification module 170 to determine the intent of the natural language expression. An intent may represent a task that the user wants to achieve.

The conversation engine 150 can use the intents determined by the classification module 170 to guide a conversation with a user. For example, if the user specifies (e.g., by voice, or by text in a query or chat session, or the like) the natural language expression "Change my email address for me", the classification module 170 can determine that the intent to change the user's email address on the online system 120 is the most applicable intent, and the conversation engine 150 can accordingly take a next step in the conversation, such as prompting the user for a new email address to substitute for the existing one, presenting a user interface showing the current email address and allowing the user to enter a new email address, or the like.

Figure 2:
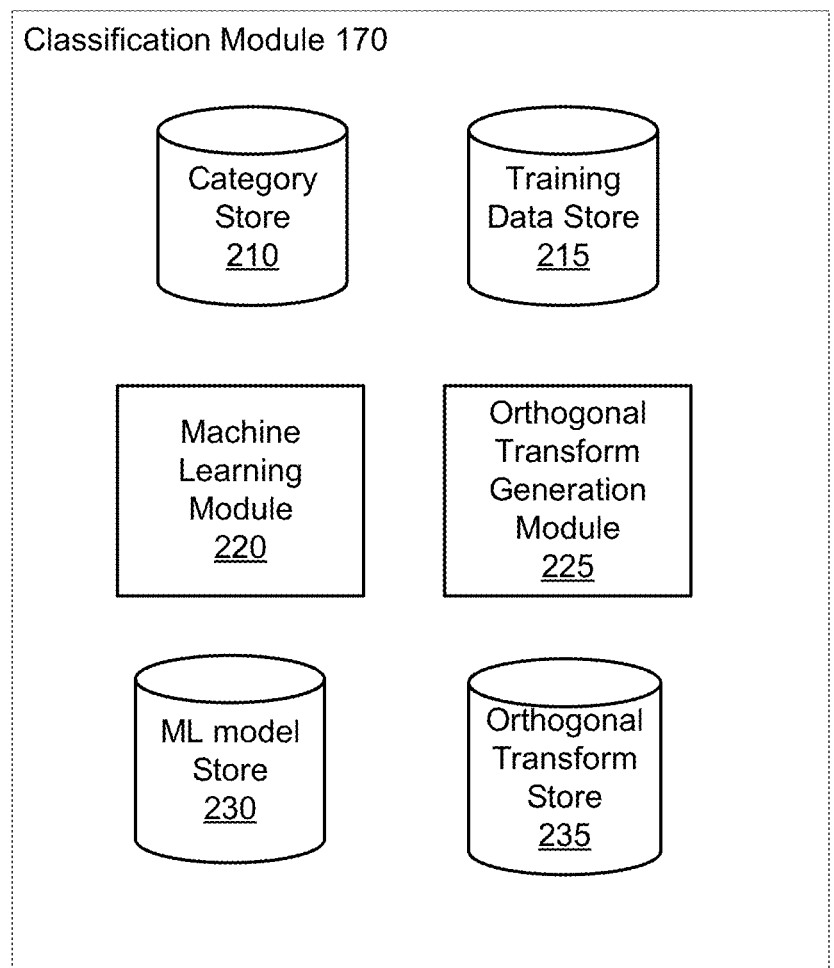
FIG. 2 is a high-level block diagram illustrating a detailed view of the classification module of FIG. 1, according to one embodiment.

In an embodiment, the classification module 170 uses a machine learning-based model, such as a neural network, to determine the intent of a natural language expression. Details of the classification module 170 are illustrated in FIG. 2 and described in connection with FIG. 2. The intent of the natural language expression may correspond to a task that the user wants to perform. The conversation engine 150 determines whether additional information is needed to perform the task and performs further conversation with the user to receive the additional information. After collecting the required information, the online system performs the requested task.

The online system 120 stores data in data store 160 that may be processed by a permitted action. For example, a task may update data stored in data store 160, search for data stored in data store 160, and so on. The data store 160 stores data for users of the online system. The data store 160 may be implemented as a relational database storing one or more tables. Each table contains data logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc. In other embodiments, the data store is implemented in unstructured format, such as with a NoSQL database.

In some embodiments, the online system 120 stores data of multiple tenants to form a multi-tenant system. Each tenant may be an enterprise. For example, a tenant may be a company that employs sales people that use the online system 120 to manage their sales processes. A multi-tenant system may store data for multiple tenants in the same physical database but enforce a logical separation of data across tenants. As a result, one tenant does not have access to another tenant's data unless such data is expressly shared.

In some such embodiments, each tenant is able to define its own metadata. For example, two tenants may define different sets of tasks that a user is allowed to perform. Accordingly, the conversation engine 150 may map a natural language expression from a user to different permitted actions for two different tenants. Furthermore, two tenants may store their data using different underlying data schemas. Accordingly, the same permitted action may execute different sets of instructions for two different tenants. This allows different tenants of the multi-tenant system to adapt the same base machine learning model to different domain specific machine learning models that behave differently for each tenant.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc. The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

FIG. 2 is a high-level block diagram illustrating a detailed view of the classification module 170 of FIG. 1, according to one embodiment. The classification module 170 includes a category store 210, a training data store 215, a machine learning (ML) module 220, an orthogonal transform generation module 225, an ML model store 230, and an orthogonal transform store 235. Other embodiments may include more or fewer modules than indicated in FIG. 2. The classification module 170 includes instructions for classifying certain type of data, for example, natural language expressions, images, audio signals, or any data that can be encoded (i.e., feature vectorized) by a pre trained machine learning model. A particular type of data may be classified into a set of categories.

The category store 210 stores metadata describing categories into which the input data is being classified. The categories may be represented in any manner (e.g., as an integer or string), as long as each category's representation is distinct from the other categories. If the input data represents natural language expressions, the categories corresponding to the intent of different natural language expressions may be represented using an integer or a string representation. For example, if the categories represent intents for a chatbot used for making reservations such as airline reservations, hotel reservations, and so on, examples of intent include "make a reservation", "change a reservation", "cancel a reservation", and so on. Accordingly, if the system uses an integer representation of categories, the system may map an integer value 1 to category "make a reservation", 2 to category "change a reservation", 3 to category "cancel a reservation", and so on. If the classification module is configured to classify images, the categories may represent the types of objects displayed in an image, for example, different types of animals, different types of plants, and so on.

The training data store 215 stores training data that is domain specific. For example, the training data may be applicable to a chatbot used for a specific type of tasks performed by a system. The training data store 215 stores mapping from natural language expressions to known intents. The mapping may be provided by expert users. According to an embodiment, the training data store 215 stores feature vectors representing each natural language expression that is mapped to an intent. Accordingly, the system can compare feature vectors representing an input natural language expression against various stored feature vectors. The system uses the intent corresponding to a matching stored feature vector as the intent of the input natural language expression.

In general, the training data store 215 stores mapping from examples representing values of any type of input to known categories. The examples for an intent are representative expressions in natural language form that are known to indicate that intent on the part of a user who uses those expressions. The examples may be stored in any suitable form, such as text (e.g., in YAML files). For instance, the examples for the intent expressing the desire to change the user's email address might be {"I want to update my email address", "I need to change my email address", "Update email address", "Please change my email address", "Update my email"}.

In embodiments in which the online system 120 stores the data of multiple tenants, each tenant may have its own set of intents and examples that are specific to the tenant, thus allowing natural language understanding that is tailored for the domain in which the tenant is operating.

The ML model store 230 stores parameters of machine learning models. The system may receive ML models that have been trained using a generic data set, for example, off-the-shelf machine learning models that may be treated using large data sets that are not specific to any domain. The ML module 220 executes processes disclosed herein to perform domain adaptation of the ML models so that a generic ML model (referred to herein as a base ML model) is transformed into a domain specific model that performs better on domain specific inputs. The transformed ML model is stored in the ML model store 230.

The ML module 220 uses an orthogonal transformation for transforming the ML model. The orthogonal transform reduces the dimensions of the base ML model. Accordingly, applying the orthogonal transform to the base ML model causes the bases ML model to discard (or ignore) some of the dimensions that are not relevant for a particular domain. Applying the orthogonal transform to the base ML model is also referred to herein as performing an orthogonal projection of the base ML model to a smaller dimensional space.

The orthogonal projection of the base ML model comprises a change of basis, via rotation and reflection, followed by a truncation of coordinates of the base ML model.

The orthogonal transform generation module 225 generates the orthogonal transform based on the data stored in the training data store. The orthogonal transform includes a set of values (i.e., parameters) that are stored in the orthogonal transform store 235. The orthogonal transform generation module 225 determines the orthogonal projection that is most appropriate for a particular domain. The orthogonal transform generation module 225 determines the orthogonal projection that maximizes the variance of the projected ML model. The orthogonal transform generation module 225 finds an orthogonal projection that is appropriate for the ML model for a given domain subject to a given set of labels based on a training data received for that domain.

According to an embodiment, the orthogonal transform generation module 225 determines the orthogonal transform as follows. The system receives a data set X representing a collection of m utterance encodings, each utterance encoding representing a feature vector of n dimensions corresponding to a natural language expression that is specific to a domain. Each of the feature vectors is mapped to an intent value. In other embodiments, the domain may be based on a different type of data, for example, images and the feature vectors are mapped to categories. The system determines a set T of triplets based on the data, each triplet including an anchor data value $x_a$, a positive data value $x_p$, and a negative data value $x_n$. Each data value corresponds to an n dimensional feature vector based on a data value corresponding to the domain. An anchor data value $x_a$ is any data value from the data set X The positive data value $x_p$ represents a data value from the set that has the same intent as the anchor data value $x_a$. The negative data value $x_n$ represents a data value from the set that has an intent that is different from the intent of the anchor data value $x_a$. For a different domain with data of a different data type, the positive data value $x_p$ represents a data value from the set that has the same category as the anchor data value $x_a$. The negative data value $x_n$ represents a data value from the set that has a category that is different from the category of the anchor data value $x_a$.

The orthogonal transform generation module 225 determines an orthogonal transform P using the triplets determined based on the dataset. Assume that the base ML model has n dimensions and the system performs orthogonal projection to reduce the number of dimensions of the based ML model from n to d dimensions. The orthogonal transform P is a matrix that has dimensions d×n where d is the number of reduced dimensions for the domain specific ML model and n is the number of dimensions of the base ML model. Since the transform P is orthogonal, the transform satisfies the property $P \times P^T = I$, where $P^T$ is the transpose of the matrix P and I is an identity matrix. Accordingly, the transpose of the orthogonal transform is also the inverse of the orthogonal transform. The orthogonal transform generation module 225 determines the orthogonal transform P that minimizes a loss value L based on the triplets subject to the constraint $P \times P^T = I$. The loss function F is calculated based on two terms (a) a term T1 that represents a loss value based on the triplets and (b) a term T2 that represents a loss value based on the constraint $P \times P^T = I$. The system determines term T1 based on equation (1)

$$T1 = \Sigma_{(x_a, x_p, x_n) \in T} \max(\|Px_a - Px_p\|^2 - \|Px_a - Px_n\|^2 + \alpha, 0) \quad (1)$$

Accordingly, the term T1 is calculated based on a first measure of distance d1 between the anchor data point and the positive data point wherein $d1 = \|Px_a - Px_p\|_2$ and a second measure of distance d2 between the anchor data point and the negative data point, wherein $d2=\|Px_a-Px_n\|^2$. The value of the term T1 (and correspondingly the value of the loss) increases with increase in the first measure of distance d1 and decreases with increase in the second measure of distance d2.

The term T2 is determined as a value based on a difference between (1) a product of the orthogonal transformation and a transpose of the orthogonal transformation and (2) an identity transform. The term T2 is determined using the following equation (2).

$$T2=\|P \times P^T - I\|^2 \qquad (2)$$

The system determines the loss value as an aggregate value based on the terms T1 and T2, for example, the sum of terms T1 and T2 or a weighted aggregate of the terms T1 and T2. According to an embodiment, the system uses an L2 norm as the measure of distance for the calculations performed for the loss function.

According to an embodiment, the orthogonal transform generation module 225 initializes the orthogonal transform P using random parameter values. The orthogonal transform generation module 225 iteratively modifies the parameters of the orthogonal transform P to minimize the loss value L. According to an embodiment, the orthogonal transform generation module 225 performs gradient descent to minimize the loss function. The system modifies the parameter values at each step and monitors the change in the loss function as a result of the parameter modification. The iterative modification of the parameters of the orthogonal transform P is performed to minimize the loss value.

The machine learning module 220 applies the orthogonal transform P to the base ML model. For example, if the base ML model is represented as M, the machine learning module 220 determines the domain specific ML model as the product of the matrix M (having n dimensions) representing the base ML model, and the matrix P representing the orthogonal transform, i.e., the domain specific ML model is determined as M×P and has d dimensions.

Processes

Figure 3:
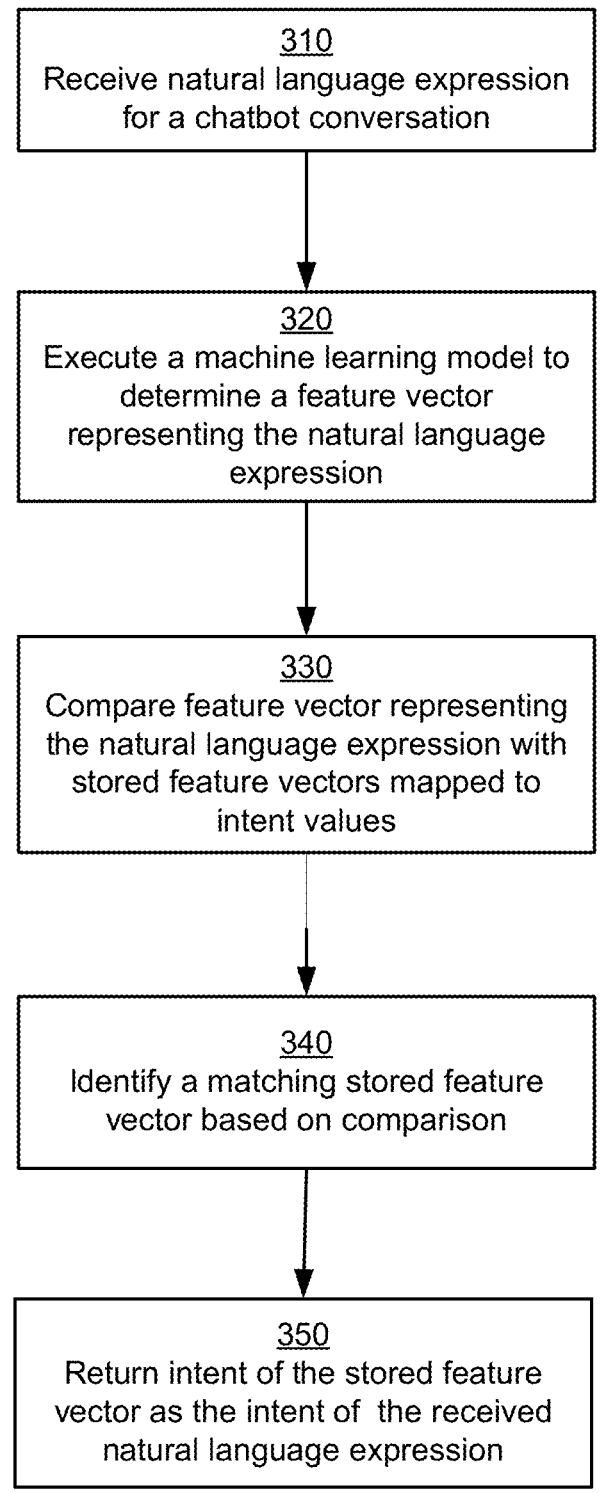
FIG. 3 is a flowchart illustrating the process executed for determining an intent for a natural language expression, according to some embodiments.
Figure 4:
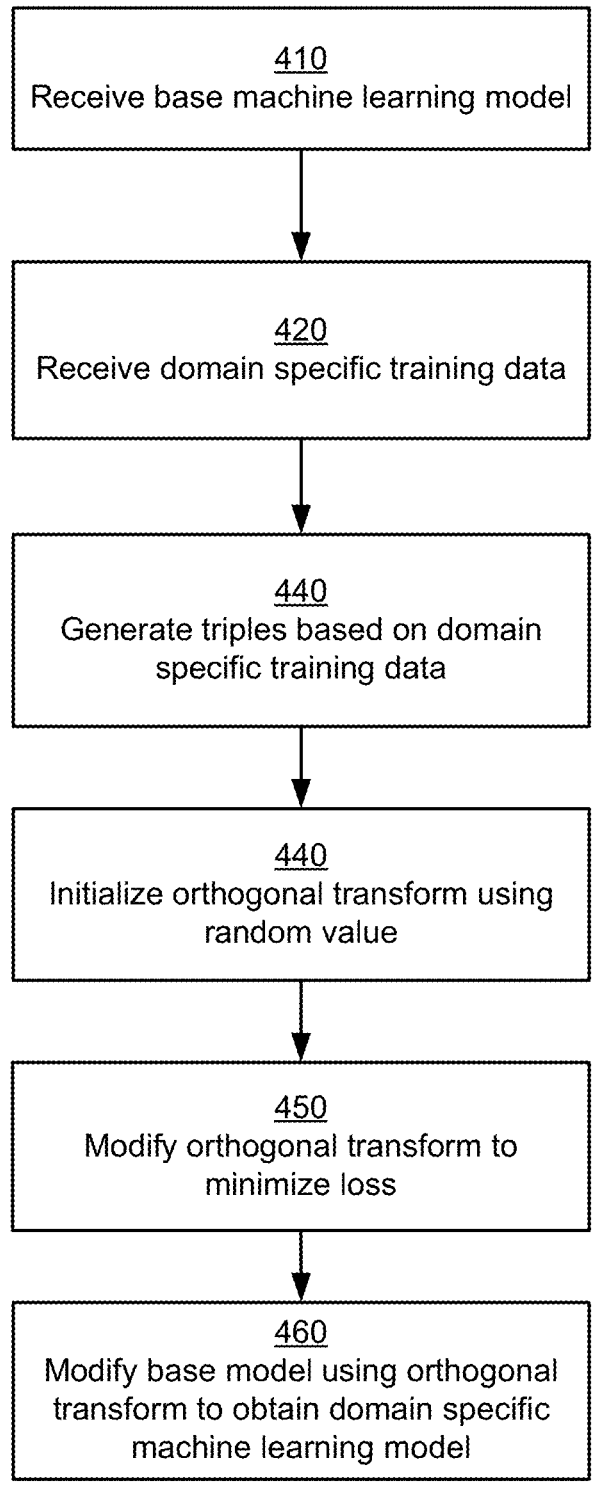
FIG. 4 is a flowchart illustrating the process for transforming a base machine learning model to a domain specific machine learning model, according to some embodiments.
Figure 5:
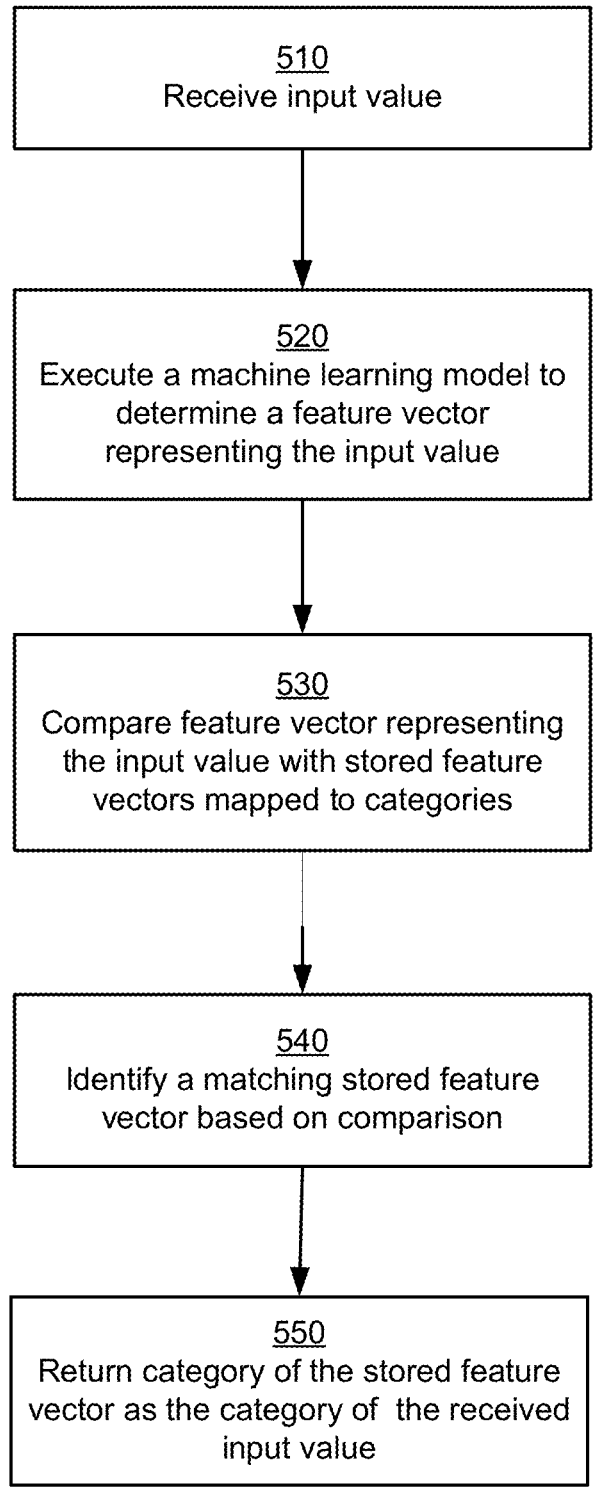
FIG. 5 is a flowchart illustrating the process for classifying an input using a machine learning model, according to some embodiments.

FIGS. 3-5 show flowcharts illustrating various processes executed by the classification module 170 according to various embodiments. The steps of the processes are described as being executed by a system, for example, by the modules of the online system 120. The steps may be executed in an order different from that indicated herein, for example, certain steps may be executed in parallel.

FIG. 3 is a flowchart illustrating the process executed for determining an intent for a natural language expression, according to some embodiments. The system receives 310 a natural language expression as input, for example, a natural language phrase or sentence received by a chatbot from a user. The system executes 320 a machine learning model configured to receive an input natural language expression and generate a feature vector representing the natural language expression. According to an embodiment, the machine learning model is a neural network, and the feature vector is an embedding generated by a hidden layer of the neural network.

The system compares 330 the generated feature vector representing the input natural language expression against a set of stored feature vectors corresponding to natural language expressions that were previously mapped to intents. The system identifies 340 a matching stored feature vector based on the comparison. The system returns 350 the intent corresponding to the matching stored feature vector as the intent of the input natural language expression.

FIG. 4 is a flowchart illustrating the process for transforming a base machine learning model to a domain specific machine learning model, according to some embodiments. The system receives 410 a base machine learning model. In an embodiment, the base machine learning model is trained using a generic training dataset that may not be specific to any particular domain. The system receives 420 domain specific training data, for example, training data based on a chatbot used for a particular type of industry or for a particular type of tasks. The system generates 440 triplets based on the domain specific training data.

The system initialized an orthogonal transform using random values, for example, the orthogonal transform P described herein. The system modifies 450 the orthogonal transform to minimize a loss function. The system modifies 460 the base model using the orthogonal transform to obtain a domain specific machine learning model. The domain specific machine learning model may be used for the process shown in FIG. 3, for example, for step 320.

The techniques disclosed herein may be used for generating domain specific machine learning model for other applications, for example, for image classification or for classification of any type of input as illustrated in FIG. 5.

FIG. 5 is a flowchart illustrating the process for classifying an input using a machine learning model, according to some embodiments.

The system receives 510 an input value, for example, an image received for classification. The system executes 520 a machine learning model configured to receive an input value and generate a feature vector representing the input value. The system compares 530 the generated feature vector representing the input value against a set of stored feature vectors corresponding to values that were previously mapped to categories. The system identifies 540 a matching stored feature vector based on the comparison. The system returns 550 the category corresponding to the matching stored feature vector as the category of the input natural language expression.

Figure 6:
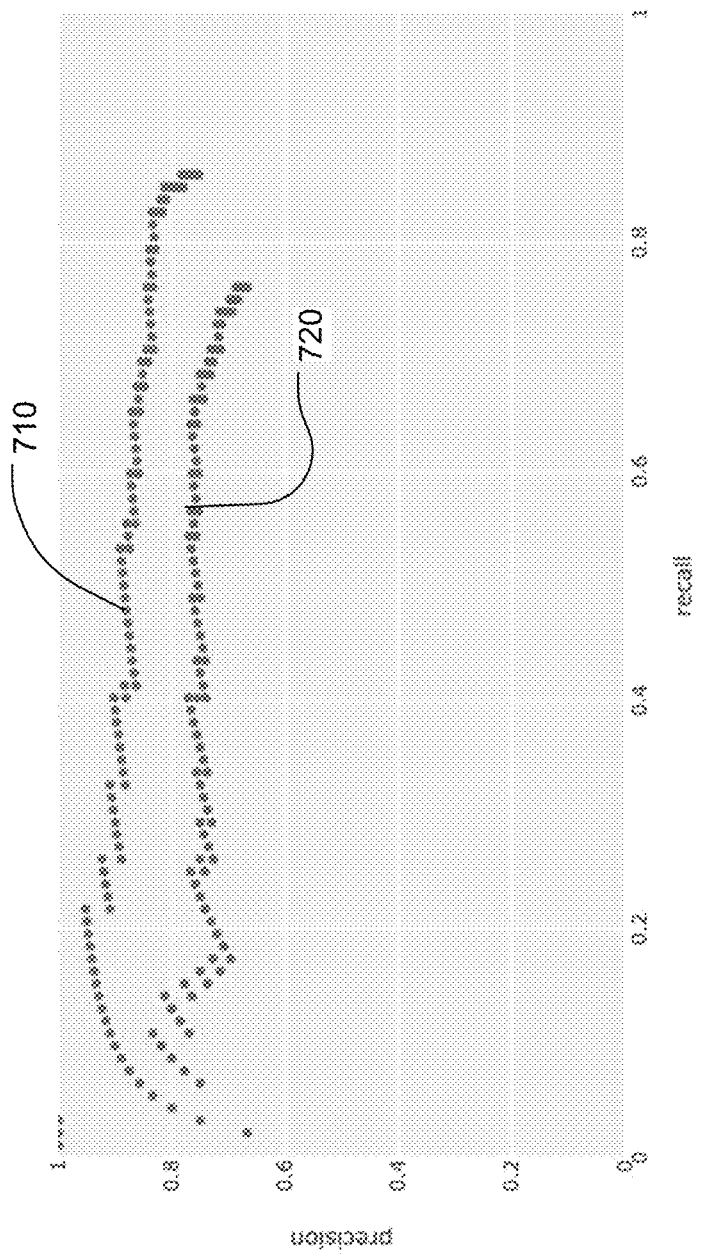
FIG. 6 is a chart illustrating the performance improvement obtained by transforming a machine learning model, according to some embodiments.

FIG. 6 is a chart illustrating the performance improvement obtained by transforming a machine learning model, according to some embodiments. The chart maps precision and recall values for inputs using a generic machine learning model and a domain specific machine learning model as determined using the process of FIG. 4. The output generated by the generic machine learning model is 720 and the output generated by the domain specific machine learning model is 710. As shown in FIG. 6, the domain specific machine learning model has higher precision and recall compared to the generic machine learning model and therefore performs better than the generic machine learning model.

Computer Architecture

Figure 7:
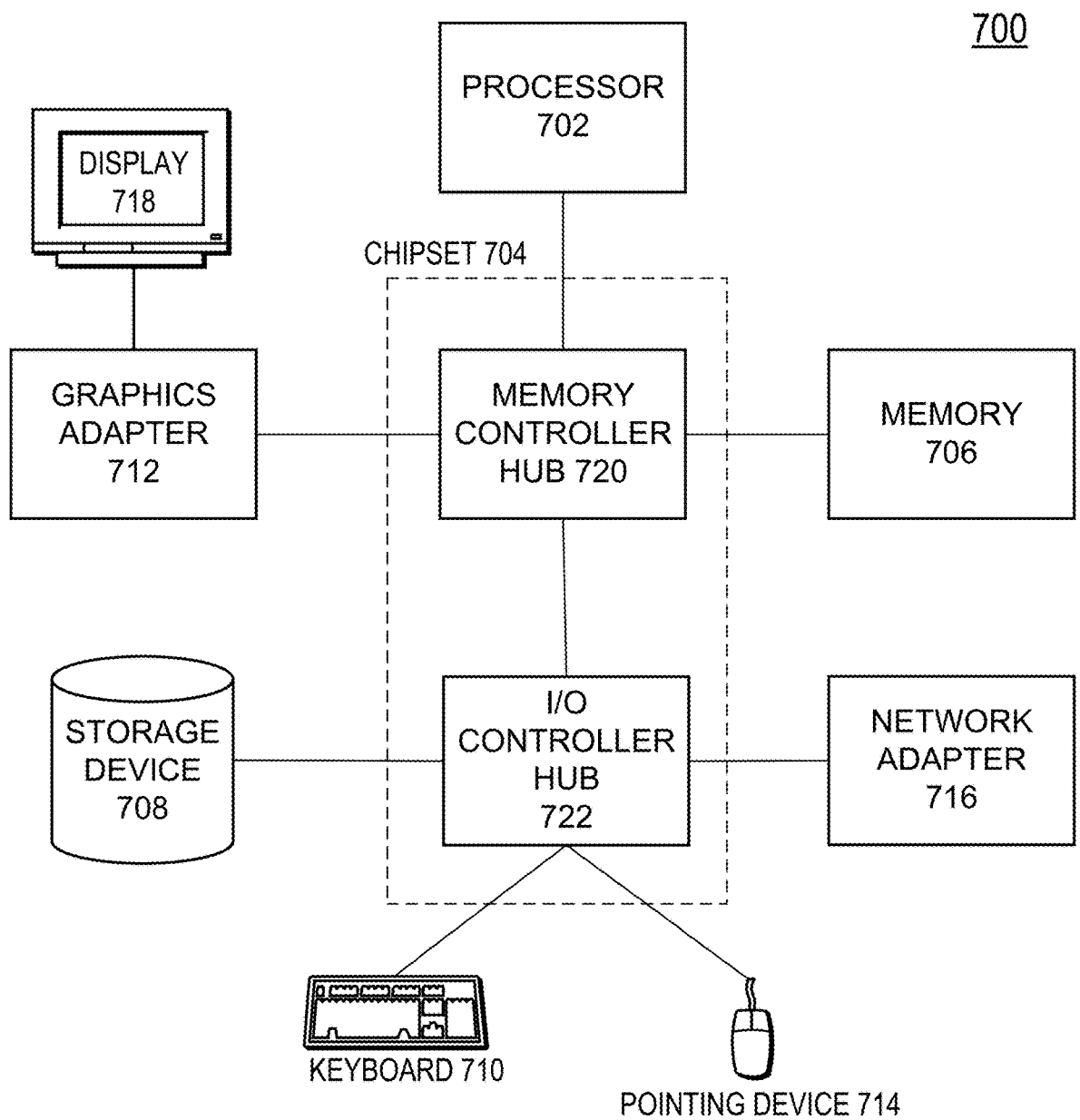
FIG. 7 is a high-level block diagram illustrating physical components of a computer used as part or all of the online system or the client devices from FIG. 1, according to one embodiment.

FIG. 7 is a high-level block diagram illustrating physical components of a computer 700 used as part or all of the online system 120 or the client devices 115 from FIG. 1, according to one embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server may lack a graphics adapter 712, and/or display 718, as well as a keyboard or pointing device. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A method for determining an intent of natural language expressions used in chatbot conversations conducted via a computing system providing computing services to a plurality of recipients via the Internet, the computing services including access to a relational database system, the method comprising:

receiving a base machine learning model trained using a generic training dataset, the base machine learning model trained to receive a natural language expression and generate a feature vector representing the natural language expression;

receiving a domain specific training dataset based on known intents for a chatbot;

determining a domain specific machine learning model by applying to the base machine learning model an orthogonal transformation reducing dimensions of the base machine learning model based on the domain specific training dataset, the orthogonal transformation comprising a change of basis via rotation and reflection followed by a truncation of coordinates of the base machine learning model;

receiving an input natural language expression used in a chatbot conversation;

executing the domain specific machine learning model based on the received natural language expression to obtain a feature vector representing the input natural language expression;

comparing the feature vector representing the input natural language expression to one or more stored feature vectors previously mapped to intents;

determining an intent for the input natural language expression based on an intent of a matching stored feature vector; and taking an action within the computing system to update one or more values within the relational database system based on the determined intent.

2. The method of claim 1, wherein determining an orthogonal transformation comprises:
initializing the orthogonal transformation based on random values; and
performing gradient descent based on the domain specific training dataset to modify the orthogonal transformation.

3. The method of claim 2, wherein determining an orthogonal transformation comprises:
initializing the orthogonal transformation based on random values;
generating a set of triplets based on the domain specific training dataset, wherein a triplet includes an anchor data point, a positive data point that has same intent as the anchor data, and a negative data point that has different intent compared to the anchor data; and
modifying the orthogonal transformation to minimize a loss value across the set of triplets.

4. The method of claim 3, wherein the loss value is based on:
a first measure of distance between the anchor data point and the positive data point, wherein the loss value increases with increase in the first measure of distance; and
a second measure of distance between the anchor data point and the negative data point, wherein the loss value decreases with increase in the second measure of distance.

5. The method of claim 3, wherein the loss value is based on a measure of difference between (1) a product of the orthogonal transformation and a transpose of the orthogonal transformation and (2) an identity transformation.

6. The method of claim 1, wherein the action comprises one or more of:
accessing data in a data store,
interacting with an external system, or
performing a transaction.

7. The method of claim 1, wherein the size of the generic training dataset is greater than the size of the domain specific training dataset.

8. The method of claim 1, wherein the domain specific training dataset comprises, for one or more categories, a plurality of input values mapped to each category.

9. A non-transitory computer-readable storage medium storing instructions that when executed by one or more computer processors, causes the one or more computer processors to perform a method for determining an intent of natural language expressions used in chatbot conversations conducted via a computing system providing computing services to a plurality of recipients via the Internet, the computing services including access to a relational database system, the method comprising:

receiving a base machine learning model trained using a generic training dataset, the base machine learning model trained to receive a natural language expression and generate a feature vector representing the natural language expression;

receiving a domain specific training dataset based on known intents for a chatbot;

determining a domain specific machine learning model by applying to the base machine learning model an orthogonal transformation reducing dimensions of the base machine learning model based on the domain specific training dataset, the orthogonal transformation comprising a change of basis via rotation and reflection followed by a truncation of coordinates of the base machine learning model;

receiving an input natural language expression used in a chatbot conversation;

executing the domain specific machine learning model based on the received natural language expression to obtain a feature vector representing the input natural language expression;

comparing the feature vector representing the input natural language expression to one or more stored feature vectors previously mapped to intents;

determining an intent for the input natural language expression based on an intent of a matching stored feature vector; and taking an action within the computing system to update one or more values within the relational database system based on the determined intent.

10. The non-transitory computer-readable storage medium of claim 9, wherein instructions for determining an orthogonal transformation cause the one or more computer processors to perform steps comprising:
initializing the orthogonal transformation based on random values; and
performing gradient descent based on the domain specific training dataset to modify the orthogonal transformation.

11. The non-transitory computer-readable storage medium of claim 10, wherein instructions for determining an orthogonal transformation cause the one or more computer processors to perform steps comprising:
initializing the orthogonal transformation based on random values;
generating a set of triplets based on the domain specific training dataset, wherein a triplet includes an anchor data point, a positive data point that has same intent as the anchor data, and a negative data point that has different intent comparted to the anchor data; and
modifying the orthogonal transformation to minimize a loss value across the set of triplets.

12. The non-transitory computer-readable storage medium of claim 11, wherein the loss value is based on:
a first measure of distance between the anchor data point and the positive data point, wherein the loss value increases with increase in the first measure of distance; and
a second measure of distance between the anchor data point and the negative data point, wherein the loss value decreases with increase in the second measure of distance.

13. The non-transitory computer-readable storage medium of claim 11, wherein the loss value is based on a measure of difference between (1) a product of the orthogonal transformation and a transpose of the orthogonal transformation and (2) an identify transformation.

14. The non-transitory computer-readable storage medium of claim 9, wherein the action comprises one or more of:
   accessing data in a data store,
   interacting with an external system, or
   performing a transaction.

15. A computing system for determining an intent of natural language expressions used in chatbot conversations conducted via the computing system, the computing system providing computing services to a plurality of recipients via the Internet and including access to a relational database system, the system configured to perform a method comprising:
   receiving a base machine learning model trained using a generic training dataset, the base machine learning model trained to receive a natural language expression and generate a feature vector representing the natural language expression;
   receiving a domain specific training dataset based on known intents for a chatbot;
   determining a domain specific machine learning model by applying to the base machine learning model an orthogonal transformation reducing dimensions of the base machine learning model based on the domain specific training dataset, the orthogonal transformation comprising a change of basis via rotation and reflection followed by a truncation of coordinates of the base machine learning model;
   receiving an input natural language expression used in a chatbot conversation;
   executing the domain specific machine learning model based on the received natural language expression to obtain a feature vector representing the input natural language expression;
   comparing the feature vector representing the input natural language expression to one or more stored feature vectors previously mapped to intents;
   determining an intent for the input natural language expression based on an intent of a matching stored feature vector; and
   taking an action within the computing system to update one or more values within the relational database system based on the determined intent.

16. The system of claim 15, wherein determining an orthogonal transformation comprises:
   initializing the orthogonal transformation based on random values; and
   performing gradient descent based on the domain specific training dataset to modify the orthogonal transformation.

17. The system of claim 16, wherein determining an orthogonal transformation comprises:
   initializing the orthogonal transformation based on random values;
   generating a set of triplets based on the domain specific training dataset, wherein a triplet includes an anchor data point, a positive data point that has same intent as the anchor data, and a negative data point that has different intent compared to the anchor data; and
   modifying the orthogonal transformation to minimize a loss value across the set of triplets.

18. The system of claim 17, wherein the loss value is based on:
   a first measure of distance between the anchor data point and the positive data point, wherein the loss value increases with increase in the first measure of distance; and
   a second measure of distance between the anchor data point and the negative data point, wherein the loss value decreases with increase in the second measure of distance.

19. The system of claim 17, wherein the loss value is based on a measure of difference between (1) a product of the orthogonal transformation and a transpose of the orthogonal transformation and (2) an identity transformation.

20. The system of claim 15, wherein the action comprises one or more of:
   accessing data in a data store,
   interacting with an external system, or
   performing a transaction.

* * * * *